United States Patent
Schacher (10) Patent No.: US 10,766,496 B2
(45) Date of Patent: Sep. 8, 2020

(54) METHOD FOR DETECTING AND CHARACTERIZING A DRIVING BEHAVIOR OF A DRIVER OR AN AUTOPILOT IN A TRANSPORTATION VEHICLE, CONTROL UNIT AND TRANSPORTATION VEHICLE

(71) Applicant: VOLKSWAGEN AG, Wolfsburg (DE)

(72) Inventor: Samuel Schacher, Berlin (DE)

(73) Assignee: Volkswagen AG, Wolfsburg (DE)

( * ) Notice: Subject to any disclaimer, the term of this patent is extended or adjusted under 35 U.S.C. 154(b) by 174 days.

(21) Appl. No.: 16/029,554

(22) Filed: Jul. 7, 2018

(65) Prior Publication Data
US 2019/0023279 A1 Jan. 24, 2019

(30) Foreign Application Priority Data
Jul. 19, 2017 (DE) .................... 10 2017 212 355

(51) Int. Cl.
*B60W 50/08* (2020.01)
*B60W 40/09* (2012.01)
(Continued)

(52) U.S. Cl.
CPC .......... *B60W 50/085* (2013.01); *B60W 40/09* (2013.01); *B60W 50/12* (2013.01);
(Continued)

(58) Field of Classification Search
CPC .... B60W 50/085; B60W 50/12; B60W 40/09; B60W 2520/105; B60W 2520/125; B60W 2540/30; G06N 3/08
See application file for complete search history.

(56) References Cited

U.S. PATENT DOCUMENTS

| 8,977,464 B1 * | 3/2015 | Takahashi | B60W 30/16 701/70 |
| 2010/0023197 A1 * | 1/2010 | Huang | B60W 40/09 701/31.4 |

(Continued)

FOREIGN PATENT DOCUMENTS

| DE | 102009034096 A1 | 9/2010 |
| DE | 102009049592 A1 | 4/2011 |

(Continued)

OTHER PUBLICATIONS

Wegschweider et al.; Model-Based Comfort Movement of Driver Assistance Systems; 2005; downloaded from https://trid.trb.org/view/942131.

(Continued)

*Primary Examiner* — Dale W Hilgendorf
*Assistant Examiner* — Alexander C. Bost
(74) *Attorney, Agent, or Firm* — Barnes & Thornburg LLP (57) ABSTRACT

A method for detecting and characterizing a driving behavior of a driver or an autopilot in a transportation vehicle which has at least one acceleration sensor used to record data points which indicate a lateral acceleration and a longitudinal acceleration of the transportation vehicle over a time interval, and a control unit used to generate an image space as a GG diagram from the data points of at least one sub-section of the time interval. The image space is transformed by the control unit by a transformation into a parameter space and coordinates of accumulation points in the parameter space are acquired by the control unit. From the coordinates of the accumulation points, by using a classification algorithm, the control unit determines a classification value and/or a classification profile relating to the driving behavior.

21 Claims, 5 Drawing Sheets

(51) Int. Cl.
*B60W 50/12* (2012.01)
*G06N 3/08* (2006.01)

(52) U.S. Cl.
CPC ......... *G06N 3/08* (2013.01); *B60W 2520/105* (2013.01); *B60W 2520/125* (2013.01); *B60W 2540/30* (2013.01)

(56) References Cited

U.S. PATENT DOCUMENTS

| | | | | |
|---|---|---|---|---|
| 2014/0278040 | A1* | 9/2014 | Singh | G01M 17/06 |
| | | | | 701/124 |
| 2015/0094927 | A1* | 4/2015 | Takahashi | B60W 30/143 |
| | | | | 701/93 |
| 2015/0239442 | A1* | 8/2015 | Yamakado | B60L 15/2009 |
| | | | | 701/70 |
| 2016/0059852 | A1* | 3/2016 | Yamakado | B60W 30/09 |
| | | | | 701/41 |
| 2016/0264135 | A1* | 9/2016 | Yamakado | B60W 30/045 |
| 2016/0347181 | A1* | 12/2016 | Yamakado | B60L 50/51 |
| 2017/0021812 | A1* | 1/2017 | Sugano | B60T 8/58 |
| 2017/0305416 | A1* | 10/2017 | Yamakado | B60W 40/109 |
| 2018/0356819 | A1* | 12/2018 | Mahabadi | B60W 30/08 |
| 2019/0196487 | A1* | 6/2019 | Akiyama | B62D 6/003 |

FOREIGN PATENT DOCUMENTS

| | | |
|---|---|---|
| DE | 102010014076 A1 | 10/2011 |
| DE | 112011105616 T5 | 7/2014 |
| DE | 102014215258 A1 | 2/2016 |
| DE | 102016117136 A1 | 3/2018 |

OTHER PUBLICATIONS

Search Report for German Patent Application No. 10 2017 212 355.9; dated Apr. 10, 2018.

Derbel et al.; Driver behavior assessment based on the G-G diagram in the DVE system; IFAC (International Federation of Automatic Control); Jan. 1, 2016; pp. 89-94.

Vaiana et al.; Driving Behavior and Traffic Safety: An Acceleration-Based Safety Evaluation Procedure for Smartphones; Modern Applied Science; Dec. 12, 2013; vol. 8, No. 1; pp. 88-96.

Search Report for European Patent Application No. 18177912.5; dated Nov. 15, 2018.

* cited by examiner

METHOD FOR DETECTING AND CHARACTERIZING A DRIVING BEHAVIOR OF A DRIVER OR AN AUTOPILOT IN A TRANSPORTATION VEHICLE, CONTROL UNIT AND TRANSPORTATION VEHICLE

PRIORITY CLAIM

This patent application claims priority to German Patent Application No. 10 2017 212 355.9, filed 19 Jul. 2017, the disclosure of which is incorporated herein by reference in its entirety.

SUMMARY

Illustrative embodiments relate to a method for detecting and characterizing a driving behavior of a driver or an autopilot in a transportation vehicle, a control unit and a transportation vehicle.

In addition to the monitoring of a longitudinal and lateral acceleration of a transportation vehicle by driving dynamics controllers to increase safety, these values are usually recorded for evaluation. Thus, for the purpose of calculating insurance premiums, it is now common to install components (transportation vehicle trackers) in transportation vehicles, which evaluate the driving style of a driver on the basis of such things as the acceleration values. The characteristic values used are based on maximum occurring decelerations, the transportation vehicle speed and other "simple" markers or characteristic values. However, it has been shown that these markers are not an appropriate basis for evaluating driving behavior. In some cases, very good drivers are classified as significantly worse than their driving skills and their driving experience would justify by the characteristic values used, because the distinction between an inexperienced and an experienced/good driver is considerably more complex than the analysis of isolated characteristic values.

BRIEF DESCRIPTION OF THE DRAWINGS

An exemplary embodiment is described in the following drawings, in which.

DETAILED DESCRIPTION

Several studies into the driving style of human drivers exist with the aim of adapting driver assistance systems. The drivers are usually classified into different driving types (defensive, normal, sporty, aggressive) on the basis of their driving speed, the maximum lateral acceleration and the distance to the transportation vehicle in front. So-called GG diagrams are also used in the analysis. A GG diagram comprises one axis for the lateral acceleration and one axis for the longitudinal acceleration. In a GG diagram measuring points are plotted, which comprise a lateral acceleration value and a longitudinal acceleration value, where these are often specified as a multiple of the acceleration due to gravity. In the following publications the driver types are evaluated according to maximum occurring accelerations, and the finer nuances in the GG diagram are not considered. The evaluation of driving style is therefore often coarse and based on ambiguous characteristic values. There is no nuanced analysis of the driving style, particularly in terms of the combination of steering and brakes.

In the report "Modellbasierte Komfortbewegung von Fahrerassistenzsystemen" ("Model-based comfort movement of driver assistance systems") (Wegscheider, M./Prokop, G./Bavarian Motor Works, BMW, Munich, DE from documentation of the German Automotive Association; 2005) a characterization of driver types in terms of a mapping of the area in a GG diagram used by a particular type of driver is described.

In DE 10 2010 014 076 A1 a method is described for adapting a driving behavior of a transportation vehicle in the event of a change of driver. The method provides for the storage of driver-specific parameters that characterize a driving style of the driver, as a virtual driver image.

Disclosed embodiments provide a method which makes it possible to characterize a driving behavior of a driver according to objective criteria.

Disclosed embodiments provide a method for detecting and characterizing a driving behavior.

To achieve the above objective, the method is designed as follows. At least one acceleration sensor is used to record data points which indicate a lateral acceleration and a longitudinal acceleration of the transportation vehicle over a time interval. A control unit is used to generate an image space, such as a GG diagram, from the data points of at least one sub-section of the time interval. In a next operation the image space is transformed by the control unit by a transformation into a parameter space. The parameter space is a dual space of the image area and can be a Hough space, for example. In the parameter space coordinates of accumulation points are detected by the control unit. An accumulation is a point or area, which has a local or global maximum. From the coordinates of the accumulation points the control unit uses a classification algorithm to determine a classification value and/or a classification profile relating to the driving behavior. In other words, the values of the lateral acceleration and the longitudinal acceleration of a transportation vehicle are measured by a sensor over a time period, wherein, for example, this is a duration of a journey. At least a portion of the data points are represented in a GG diagram. The data points can form or describe a curve in the GG diagram. The representation of the measuring points is modified by the transformation in such a way that their coordinates are not defined by the values of their respective lateral acceleration and longitudinal acceleration, but by predefined parameters. The distribution of the measuring points in the representation based on the predefined parameters can be non-uniform. Areas or places with a predefined minimum density of data points are detected by the control unit as accumulation points. From the coordinates of these areas and/or points the control unit calculates a value and/or a profile, which classify the driving behavior of the driver or the autopilot in a transportation vehicle.

For example, an acceleration sensor can detect one lateral acceleration and one longitudinal acceleration each of the transportation vehicle in specific time intervals or distance intervals over a time period as a respective data point. This results in a data point pair. A control unit, which can comprise a microcontroller and/or a microprocessor, can represent these data point pairs of at least a portion of the time interval as a GG diagram. The values of the respective data point pair are interpreted as coordinates and entered as a point in the GG diagram. This GG diagram can be transformed by the control unit by a transformation from an image space into a parameter space. Accumulation points can occur in the parameter space. These accumulation points can be detected by the control unit, and their coordinates recorded. From the coordinates of the accumulation points, the control unit can calculate a classification value and/or a classification profile by a classification algorithm.

The disclosed embodiments ensure that the characterization of a driver is not based on individual values, but instead on the basis of patterns of the driving behavior.

An extension of the disclosure provides that the coordinates of the parameter space are parameters of a straight line. In other words, the axes of the parameter space are assigned to variables which can describe a straight line. One of the parameters can be, for example, an angle of a straight line with respect to an axis, or an angle of a normal to the straight line with respect to an axis. Another parameter can be, for example, a distance from the base of a perpendicular to the straight line to an origin. This results in the straight lines in the image space forming accumulation points in the parameter space, which can be detected by the control unit. The detection of straight lines in the GG diagram is beneficial, because the direction of a straight line can be used to describe the relationship between the longitudinal acceleration and the lateral acceleration.

An extension provides that the coordinates of the parameter space comprise coordinates of a center of a circle and a radius of a circle. In other words, the axes of the parameter space are coordinates of a center of a circle in the image space and are assigned to a circle radius. This results in the circular structures being be identified in the trajectory of the GG diagram. The identification of circles in the GG diagram is beneficial because circular structures in the image space can be used as a basis for making inferences about the driving behavior. Thus, the trajectory of the GG diagram for driving through a bend in an optimal way has circular patterns with large radii.

An extension provides that the transformation is a Hough transform. In other words, the image space is transformed into a parameter space by a Hough transform. This could be, for example, the original Hough transform, the circular Hough transform, the generalized Hough transform or another adaptation of the original Hough transform. This results in the patterns being detected in the shape of the GG diagram.

An extension provides that the values of the lateral acceleration and the values of the longitudinal acceleration of at least one sub-section of the time interval are smoothed and/or filtered by the control unit. In other words, the control unit processes the values of the lateral acceleration and the values of the longitudinal acceleration such that oscillations and outliers are removed from the curve in the GG diagram. It may be, for example, that the values are adapted in such a way that the path of the characteristic curve in the GG diagram is smoothed and/or a noise level is reduced. This results in the small fluctuations being balanced out, which simplifies the detection of patterns.

An extension provides that the classification value and/or the classification profile are transmitted to a driver assistance system and/or an external central computer. It may be, for example, that the classification value and or the classification profile are transmitted to a driver assistance system to compensate for a driving behavior classified as dangerous by an intervention by the driver assistance system. This results in a further processing of the calculated qualification value and or the qualification profile being enabled.

An extension of the disclosure provides that the at least one sub-section of the time interval is determined by the control unit depending on predefined geographical data and/or on values of the lateral acceleration and/or the longitudinal acceleration. In other words, the choice of the sub-section of the time interval is determined by the control unit on the basis of predefined geographical data and/or values of the lateral acceleration and/or the longitudinal acceleration. The predefined geographical data can be, for example, road bends and or intersections. Predefined values of the lateral and or longitudinal acceleration can be, for example, a combination of values which indicate a bend. Therefore, it is not necessary to evaluate the shape of the curve in the GG diagram over the entire time interval, but the specific sub-sections can be selected, which are suitable for characterizing a driving behavior. These sub-sections can be bends in the road.

An extension provides that the classification algorithm comprises a support vector machine and/or an artificial neural network. In other words, a support vector machine and or a neural network are used for the classification of the driving behavior. This results in the complex patterns that occur in the parameter space being detected.

The disclosed embodiments also provide a control unit for the transportation vehicle. The control unit has a processor device, which is configured to carry out an exemplary embodiment of the disclosed method. For this purpose the processor device can have at least one microprocessor and/or at least one microcontroller. Furthermore, the processor device can have program code which is configured, when executed by the processor device, to carry out the exemplary embodiment of the disclosed method. The program code can be stored in a data memory of the processor device.

The disclosed embodiments also provide a transportation vehicle, which comprises a control unit for carrying out a disclosed method.

In the exemplary embodiment, the components of the embodiment described represent individual features of the disclosure to be considered independently of each other, which also extend the disclosure independently of each other and thus are also to be regarded, either individually or in a combination other than the one shown, as an integral part of the disclosure. Furthermore, the embodiment described can also be extended to include other features already described.

In the figures, functionally equivalent elements are provided with the same reference numerals.

Figure 1:
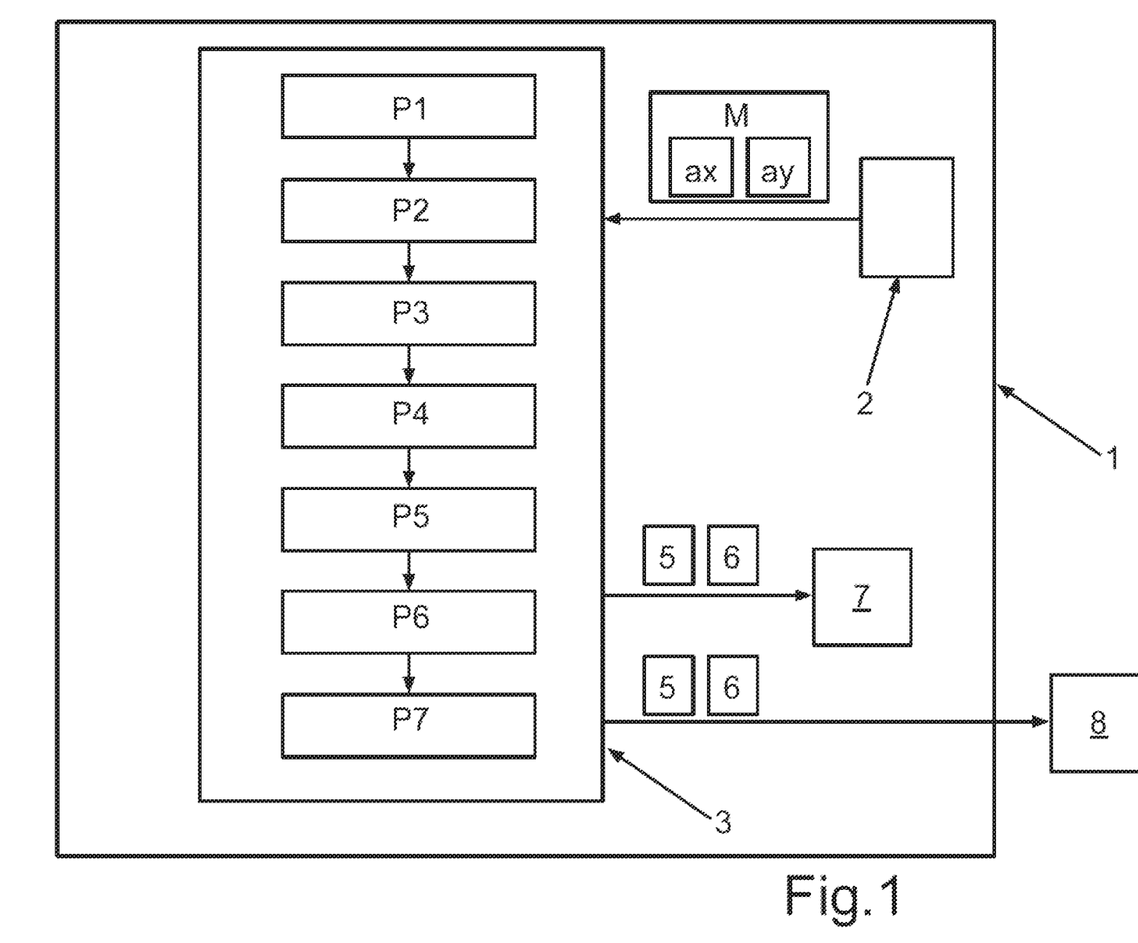
FIG. 1 shows a schematic outline of an embodiment of the disclosed method.

FIG. 1 shows a schematic outline of a disclosed method for detecting and characterizing a driving behavior of a driver or an autopilot in a transportation vehicle. In a first operation at P1, a lateral acceleration ay and a longitudinal acceleration ax of a transportation vehicle 1 can be detected by an acceleration sensor 2 in data points M over a time interval T. The time interval can be an operating period of the transportation vehicle 1. The acceleration sensor 2 can be, for example, a component of a device for controlling driving dynamics. The values of the lateral acceleration ay and the values of the longitudinal acceleration ay at corresponding points in time, which are detected at least within a sub-section T1 of the time interval T, can be processed by a control unit 3 (P2). The control unit 3 can comprise, for example, a microcontroller or a microprocessor. The values of the longitudinal acceleration ax and/or the lateral acceleration ay can be processed by the control unit 3. The values ax, ay can be filtered and/or smoothed, for example. The control unit 3 can generate an image space I from the values as a GG diagram (P3). A GG diagram can be constructed as a Kamm circle. One axis of the GG diagram can be assigned to the longitudinal acceleration ax and another axis to the lateral acceleration ay. It may be that the GG diagram only comprises data points M of a sub-section T1 of the time interval. The sub-section of the time interval T1 can be defined by the control unit 3, for example, depending on predefined geographical data and/or values of the lateral acceleration ay and/or values of the longitudinal acceleration ax. For example, it may be that the sub-section T1 describes a period in which the transportation vehicle 1 is driving around a bend. The image space I can be transformed by the control unit 3 by a transformation into a parameter space P (P4). The transformation can be, for example, a transformation which is applied as part of a digital image processing and or pattern recognition method. This can be a Hough transformation or a Radon transformation. For example, the parameter space P can be configured in such a way that the co-ordinates of the parameter space P are parameters of a straight line. For example, it may be the case that one axis is assigned to a specific angle θ and another axis is assigned to a distance p to a specific point. It may also be the case that the parameters of the parameter space P are coordinates of a center of a circle and a radius of a circle. It may be that the parameter space P contains accumulation points D, which are to be assigned to a straight line and/or a circle in the image space. It may be that these accumulation points D are detected by the control unit 3 (P5). This can be performed, for example, by detecting maxima. From the coordinates of the accumulation points D, by a classification algorithm 4, the control unit 3 can determine a classification value 5 and/or a classification profile 6 (P6). In other words, this can mean that a classification value 5 and/or a classification profile 6 can be calculated, for example, on the basis of circular and/or straight-line patterns in the image space I. For example, a classification value 5 can be a scalar value, which can be calculated from the coordinates of the accumulation points D. The classification value 5 can be assigned to a driving behavior of a driver and/or a transportation vehicle 1. A classification profile 6 can comprise, for example, a plurality of classification values 5, and/or maximum values of the longitudinal acceleration ax and/or the lateral acceleration ay. It may be that the classification value 5 and/or the classification profile 6 are assigned to a particular driver. It may be the case that the classification algorithm 4 comprises a support vector machine and/or an artificial neural network. It can be the case that the classification value 5 and/or the classification profile 6 are transmitted to a driver assistance system 7 and/or an external central computer 8 (P7). The driver assistance system 7 can be a driving dynamics control device. The external central computer 8 can be, for example, a central computer of the transportation vehicle manufacturer.

Figure 2:
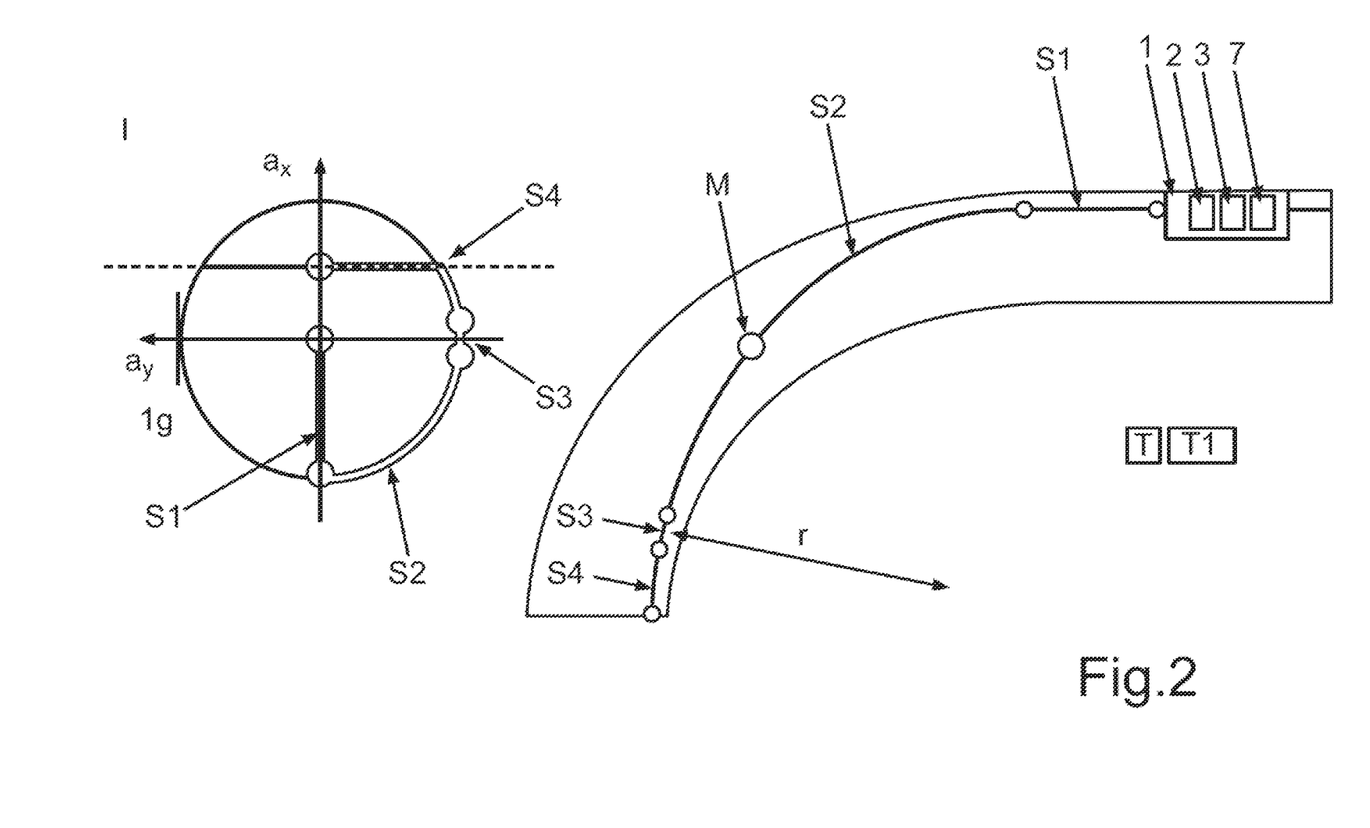
FIG. 2 shows a GG diagram of a driving maneuver, which can be taken as the basis of the disclosed method.

FIG. 2 shows one possible GG diagram as an image space I of a driving maneuver. It may be that a transportation vehicle 1, which comprises an acceleration sensor 2 and a control unit 3, is driving around a bend. It may be that the path of the transportation vehicle 1 can be subdivided into four sections S1, S2, S3, S4. It may be that the transportation vehicle 1 brakes in the first section S1 ahead of the bend without changing its direction of travel. In other words, it may be that the longitudinal acceleration ax has a negative value and the lateral acceleration ay is zero. It may be that the transportation vehicle 1 reduces the amount of braking along a second section S2 and steers at the same time. In other words, it may be that the size of the longitudinal acceleration ax decreases along the second section S2 and the size of the lateral acceleration ay increases along the second section S2. It may be that the size of the longitudinal acceleration ax in a third section S3 is a minimum and the magnitude of the lateral acceleration ay reaches a maximum. It may be that the curve in the third section S3 has a minimum radius r of the maneuver. It may be that along a fourth section S4 the lateral acceleration ay is reduced at the same time as the longitudinal acceleration ax is increased, so that at the end of the bend the transportation vehicle 1 is driving straight again and accelerating.

Figure 3:
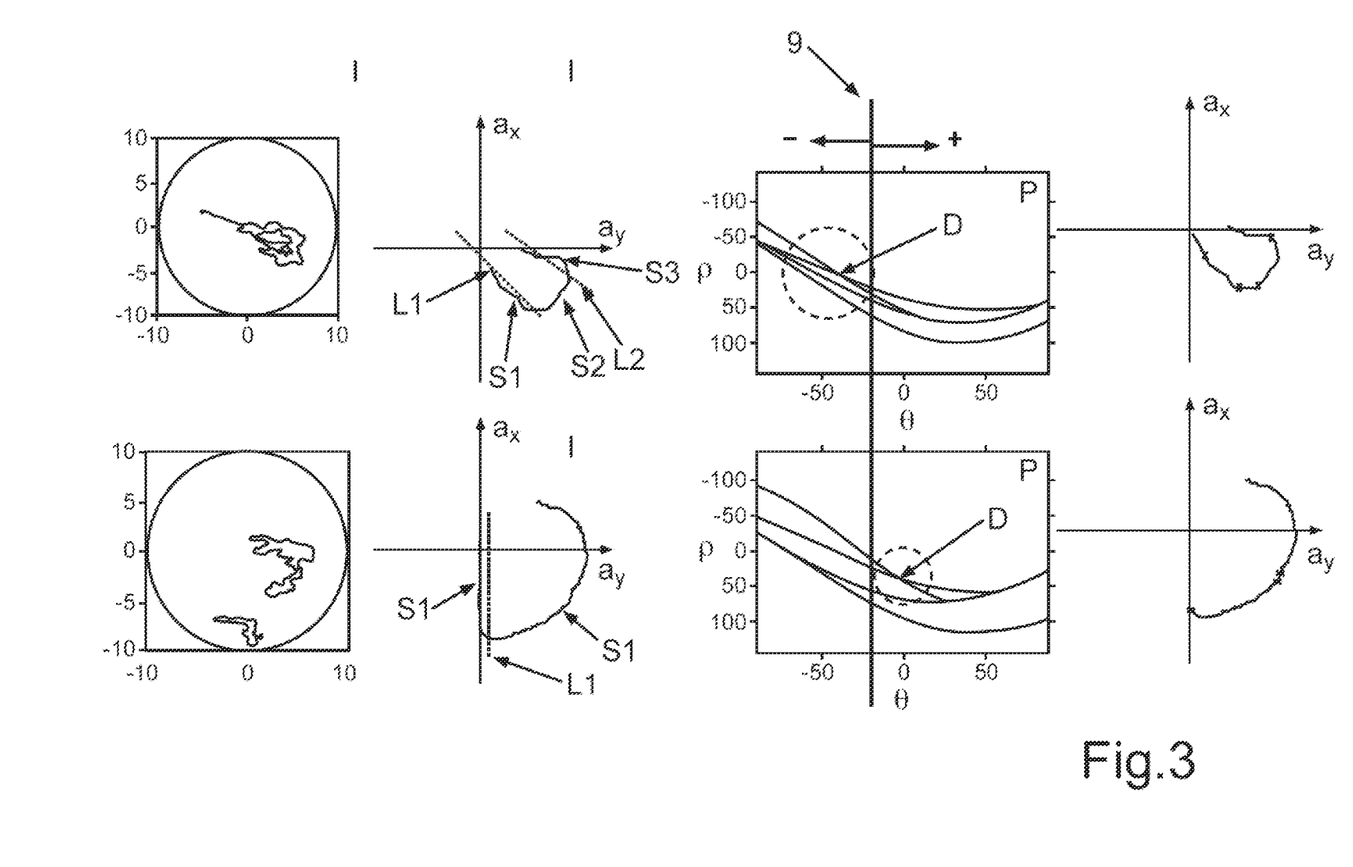
FIG. 3 shows possible image spaces and parameter spaces such as can be obtained in accordance with the disclosed method.

FIG. 3 shows possible image spaces and parameter spaces of different maneuvers through a bend. It may be that longitudinal accelerations ax and lateral accelerations ay for a transportation vehicle 1 are detected along a bend and represented in an image space I, which are shown in the first column. It may be that the measured values M are processed. It may be that an image space I with processed values is transformed into a parameter space P. It may be that the transportation vehicle steers and brakes in a bend at the same time 1. In other words, it may be that over a section S1 at the beginning of the bend the size of the longitudinal acceleration ax and the size of the lateral acceleration ay both increase. As a result, it may be that the trajectory of a first section S1 passes along a straight line L1, the normal of which can have an angle θ of approx. −50° to the abscissa. It may be that in a second section S2 the size of the longitudinal acceleration ax decreases at the same time as the size of the lateral acceleration ay increases. It may be that in a third section S3, the size of the longitudinal acceleration ax and the size of the lateral acceleration ay both decrease. It may be that the trajectory of the third section S3 leads to an accumulation point D in the parameter space, which a straight line L2, the normal of which has an angle θ of −50° to the abscissa. It may be that the parameter space P is a Hough space. It may be that the parameter p describes a distance of the straight line to the origin and the angle θ describes the angle between the normal to the straight line and the ay-axis. It may be that the normal to the straight line was calculated using the Hessian normal form. It may be that the trajectory can be divided into a plurality of straight lines Li.

It may be that a second curve describes a transportation vehicle 1 driving through a bend, wherein in a first section S1 the size of the longitudinal acceleration ax increases and the lateral acceleration ay has a negligible value. It may be that a remaining section S2 passes along a circle segment. It may be that the associated parameter space has an accumulation point D, which arises due to the trajectory of the first section along a straight line L1, which has an angle of 0 degrees. It may be that other edges or straight lines can be detected as accumulation points D in the parameter space P. It may be that a classification value 5 and/or a classification profile 6 are calculated as a function of the location of the accumulation points D. It may be, for example, that the classification value 5 depends on the angle θ at which an accumulation point D occurs. It may be that a driving behavior is evaluated as positive (symbolized with + in FIG. 3) if the angle θ of at least one accumulation point D in the parameter space P is greater than a predetermined threshold value 9, and a driving behavior is evaluated as negative (symbolized with—in FIG. 3) if the angle θ of at least one accumulation point D is less than a predefined value. This is related to the fact that simultaneous braking and steering of a transportation vehicle 1 is perceived by the occupants as unpleasant.

Figure 4:
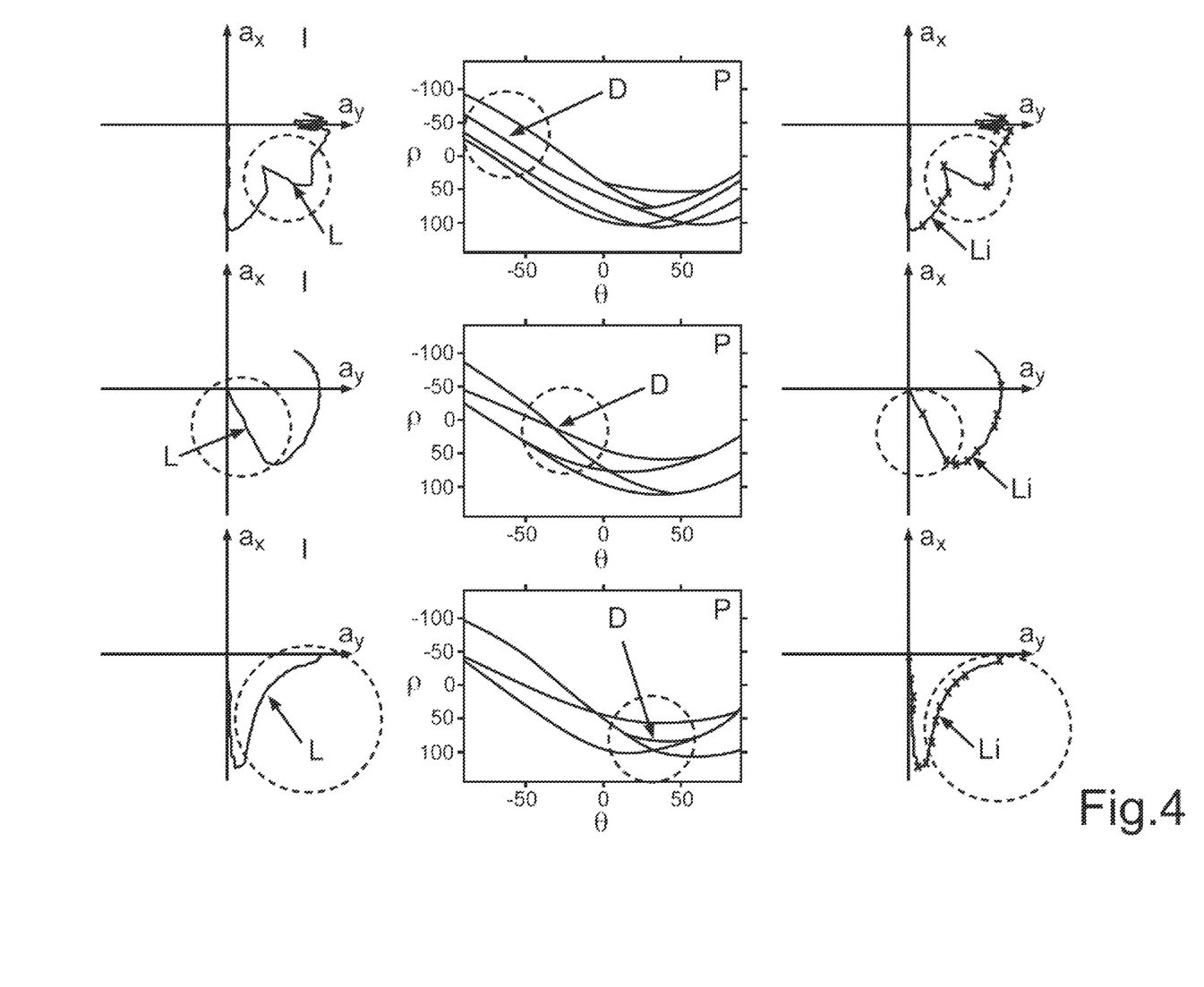
FIG. 4 shows possible additional image spaces and parameter spaces.

FIG. 4 shows possible image spaces I and parameter spaces P of different bends. The first column shows the path of the acceleration ax, ay in the GG diagram I. A circle indicates a straight line L, which appears as an accumulation point D in the parameter space P. The associated accumulation point D in the parameter space P is also indicated by a circle. It may be that by detecting the accumulation points D in the parameter space P, the path in the GG diagram I can be broken down into individual straight lines Li.

Figure 5:
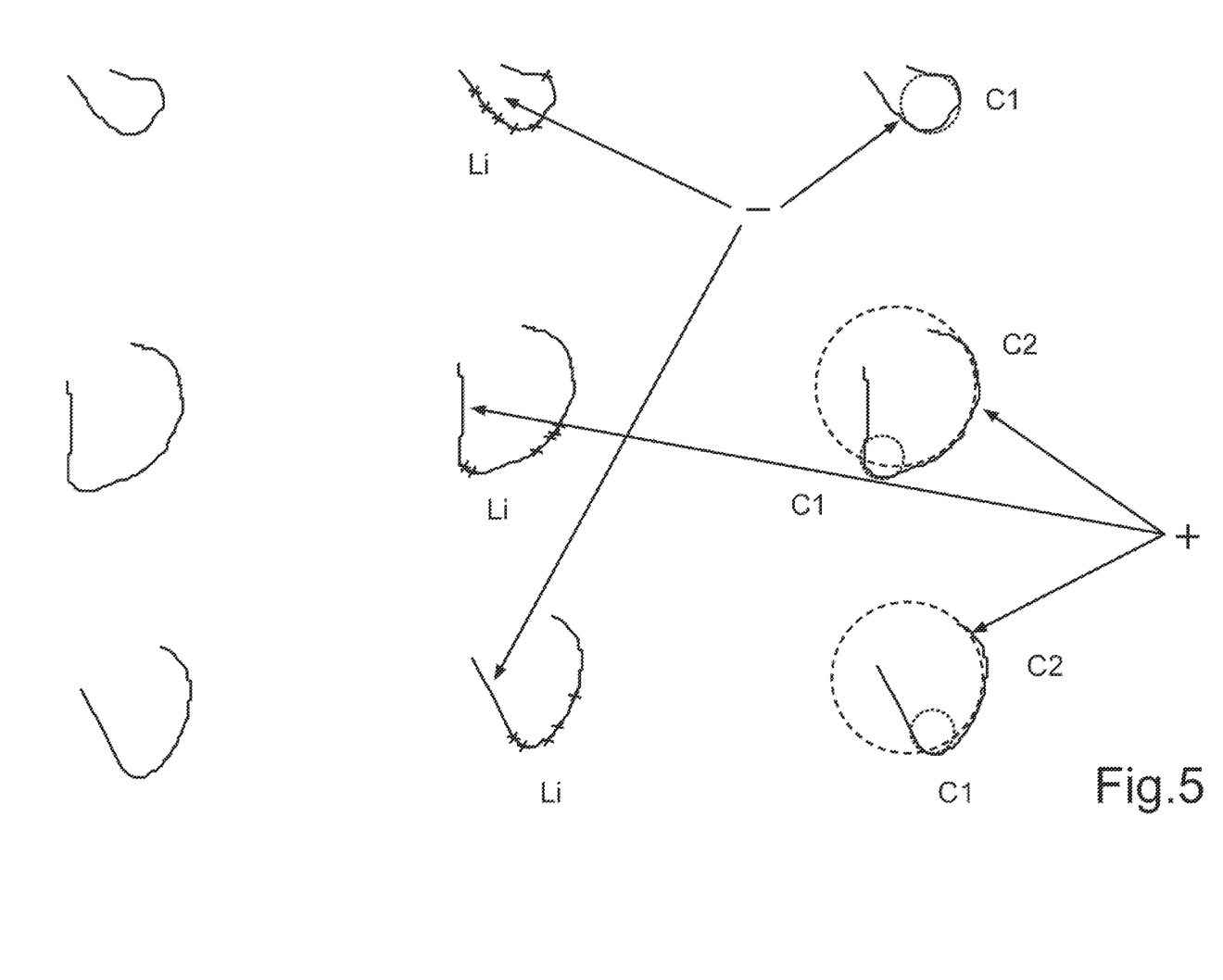
FIG. 5 shows a circular patterns identified in the GG diagram in accordance with the disclosed method.

FIG. 5 shows possible curves of the acceleration in the GG diagram. The left-hand column shows the processed curves prior to an evaluation, the middle column shows straight lines Li detected in the curves and the right-hand column shows circular structures C1, C2 identified in the curves. The circles can be identified, for example, by detecting accumulation points D in a parameter space P, which is formed from the coordinates of the centers and the radii of the circles. It may be that, for example, two circular structures C1, C2 are identified in the patterns. It may be that the classification value 5 and/or the classification profile 6 are dependent on the coordinates of a center of a circle and or the radius of a circle. This dependence may have been set, because studies have shown that corresponding structures in the GG diagram are related to an optimal driving behavior, or one which is perceived to be pleasant. It may be that the classification is performed using a support vector machine, a linear regression procedure, k-means and/or a convolutional neural network.

On the basis of the classification value 5 and/or the classification profile 6, for example, a driver assistance system 7 of the transportation vehicle 1 can activate a gear shift in such a way that the choice of gear is optimized for the driving behavior of the driver or the autopilot.

Overall, the example shows how a method is provided by the disclosure, which delivers better indicators than absolute and maximum values by detecting patterns in the driving style.

LIST OF REFERENCE NUMERALS

P1-P7 operations of the method
S1-S4 sections of a bend
1 transportation vehicle
2 sensor unit
3 control unit
4 classification algorithm
5 classification value
6 classification profile
7 driver assistance system
8 central computer
9 threshold value
L1, L2, Li straight lines
C1, C2 circular structures
D accumulation points
T time interval
T1 sub-space
M data point
ax longitudinal acceleration
ay lateral acceleration
r bend radius
I image space
P parameter space

The invention claimed is:

1. A control unit comprising:
a processor; and
a program having a program code for carrying out a method for detecting and characterizing a driving behavior of a driver or an autopilot in a transportation vehicle when the program code is executed on the processor, the method comprising:
generating an image space as a GG diagram from data points of at least one subsection of a time interval, wherein the data points are recorded by at least one acceleration sensor and indicate a lateral acceleration and a longitudinal acceleration of the transportation vehicle over the time interval;
transforming the image space by a transformation into a parameter space, wherein the transformation is a Hough transform or a Radon transform;
acquiring coordinates of accumulation points in the parameter space; and
determining a classification value and/or a classification profile relating to the driving behavior using a classification algorithm based on the coordinates of the accumulation points.

2. The control unit of claim 1, wherein the coordinates of the parameter space are parameters of a straight line.

3. The control unit of claim 1, wherein the coordinates of the parameter space are coordinates of a center of a circle and a radius of a circle.

4. The control unit of claim 1, further comprising smoothing and/or filtering the values of the lateral acceleration and the values of the longitudinal acceleration of at least one sub-section of the time interval by the control unit.

5. The control unit of claim 1, further comprising transmitting the classification value and/or the classification profile to a driver assistance system and/or an external central computer.

6. The control unit of claim 1, wherein the at least one sub-section of the time interval is determined by the control unit as a function of predefined geographical data and/or on values of the lateral acceleration and/or longitudinal acceleration.

7. The control unit of claim 1, wherein the classification algorithm comprises a support vector machine and/or an artificial neural network.

8. A transportation vehicle comprising:
a control unit that includes a processor and a program having a program code for carrying out a method for detecting and characterizing a driving behavior of a driver or an autopilot in a transportation vehicle when the program code is executed on the processor, the method comprising:
generating an image space as a GG diagram from data points of at least one subsection of a time interval, wherein the data points are recorded by at least one acceleration sensor and indicate a lateral acceleration and a longitudinal acceleration of the transportation vehicle over the time interval;
transforming the image space by a transformation into a parameter space, wherein the transformation is a Hough transform or a Radon transform;
acquiring coordinates of accumulation points in the parameter space; and
determining a classification value and/or a classification profile relating to the driving behavior using a classification algorithm based on the coordinates of the accumulation points.

9. The transportation vehicle of claim 8, wherein the coordinates of the parameter space are parameters of a straight line.

10. The transportation vehicle of claim 8, wherein the coordinates of the parameter space are coordinates of a center of a circle and a radius of a circle.

11. The transportation vehicle of claim 8, further comprising smoothing and/or filtering the values of the lateral acceleration and the values of the longitudinal acceleration of at least one sub-section of the time interval by the control unit.

12. The transportation vehicle of claim 8, further comprising transmitting the classification value and/or the classification profile to a driver assistance system and/or an external central computer.

13. The transportation vehicle of claim 8, wherein the at least one sub-section of the time interval is determined by the control unit as a function of predefined geographical data and/or on values of the lateral acceleration and/or longitudinal acceleration.

14. The transportation vehicle of claim 8, wherein the classification algorithm comprises a support vector machine and/or an artificial neural network.

15. A method for detecting and characterizing a driving behavior of a driver or an autopilot in a transportation vehicle, the method comprising:
recording data points by at least one acceleration sensor, wherein the data points indicate a lateral acceleration and a longitudinal acceleration of the transportation vehicle over a time interval;
generating an image space, by a control unit, as a GG diagram from the data points of at least one sub-section of the time interval;
transforming the image space, by the control unit, by a transformation into a parameter space, wherein the transformation is a Hough transform or a Radon transform; and
acquiring coordinates of accumulation points in the parameter space by the control unit, wherein the control unit determines a classification value and/or a classification profile relating to the driving behavior by a classification algorithm from the coordinates of the accumulation points.

16. The method of claim 15, wherein the coordinates of the parameter space are parameters of a straight line.

17. The method of claim 15, wherein the coordinates of the parameter space are coordinates of a center of a circle and a radius of a circle.

18. The method of claim 15, further comprising smoothing and/or filtering the values of the lateral acceleration and the values of the longitudinal acceleration of at least one subsection of the time interval by the control unit.

19. The method of claim 15, further comprising transmitting the classification value and/or the classification profile to a driver assistance system and/or an external central computer.

20. The method of claim 15, wherein the at least one sub-section of the time interval is determined by the control unit as a function of predefined geographical data and/or on values of the lateral acceleration and/or longitudinal acceleration.

21. The method of claim 15, wherein the classification algorithm comprises a support vector machine and/or an artificial neural network.

* * * * *